United States Patent [19]

Kikuya et al.

[11] Patent Number: 4,591,936
[45] Date of Patent: May 27, 1986

[54] TAPE CASSETTE PIVOTAL COVER LOCKING ARRANGEMENT

[75] Inventors: Satoshi Kikuya, Katano; Seiko Minamide, Nara; Narito Shibaike, Habikino, all of Japan

[73] Assignee: Matsushita Electric Industrial Co., Ltd., Osaka, Japan

[21] Appl. No.: 478,208

[22] Filed: Mar. 23, 1983

[30] Foreign Application Priority Data

Mar. 23, 1982 [JP] Japan ................... 57-46668
Mar. 23, 1982 [JP] Japan ............... 57-41111[U]
Mar. 24, 1982 [JP] Japan ................... 57-47562
Apr. 2, 1982 [JP] Japan ............... 57-48498[U]
Jun. 30, 1982 [JP] Japan ............... 57-99909[U]

[51] Int. Cl.⁴ .................. G11B 23/02; G11B 23/04
[52] U.S. Cl. .......................... 360/132; 242/198
[58] Field of Search .................. 360/132, 85, 93; 242/197-200

[56] References Cited

U.S. PATENT DOCUMENTS

| | | | |
|---|---|---|---|
| 3,900,170 | 8/1975 | Serizawa | 242/198 |
| 4,173,319 | 11/1979 | Umeda | 242/199 |
| 4,323,207 | 4/1982 | Gebeke | 242/198 |
| 4,418,373 | 11/1983 | Fujimoro et al. | 360/132 |
| 4,484,248 | 11/1984 | Ogiro et al. | 360/132 |
| 4,485,988 | 12/1984 | Kikuya et al. | 242/198 |
| 4,485,990 | 12/1984 | Ogiro et al. | 242/199 |
| 4,494,161 | 1/1985 | Ogata et al. | 360/132 |
| 4,504,028 | 3/1985 | Goto | 242/198 |

FOREIGN PATENT DOCUMENTS

| | | | |
|---|---|---|---|
| 58-164067 | 9/1983 | Japan | 360/132 |
| 58-164066 | 9/1983 | Japan | 360/132 |
| 58-164068 | 9/1983 | Japan | 360/132 |

*Primary Examiner*—S. J. Heinz
*Assistant Examiner*—Benjamin E. Urcia
*Attorney, Agent, or Firm*—Stevens, Davis, Miller & Mosher

[57] ABSTRACT

Disclosed is a tape cassette having a front cover urged in the direction for covering, by pivoting, a tape stretched along the front surface of a cassette case, and a cover-locking piece adapted to pivot within a plane thicknesswise of the tape cassette while being urged in the direction for holding the pivoting of the front cover when it is not in use. The tape cassette is further provided with an optical path aperture formed in a side surface portion thereof in order to form an optical path through the tape stretched inside the tape cassette when it is in use. The tape cassette is improved in its assembling efficiency while preventing disengagement of urging springs thereof in assembly. Moreover, it is possible to obtain satisfactory functions of the front cover and the cover-locking piece while preventing foreign matter such as dust from entering the inside of the tape cassette by covering the optical path aperture when the tape cassette is not in use. Furthermore, the tape cassette can be made microminiature by permitting the required widthwise dimension thereof to be extremely small.

4 Claims, 17 Drawing Figures

TAPE CASSETTE PIVOTAL COVER LOCKING ARRANGEMENT

BACKGROUND OF THE INVENTION

The present invention relates to a tape cassette for use in audio, video and data recorders, and more particularly, to a tape cassette having a front cover for covering the tape stretched along an opening formed in the front surface of a casette case and a cover-locking piece for preventing the front cover from opening when the tape cassette is not in use.

Examples of the conventional tape cassette of this type include those employed in conventional VHS or β system VTRs. Both of these tape cassettes have a front-cover spring for urging the front cover to pivot toward a position in which the front cover protects the tape stretched along the opening formed in the front surface thereof. In addition, the tape cassette is provided with a coverlocking piece adapted to prevent the front cover from opening when the tape cassette is not in use and to pivot in the widthwise direction of the tape cassette, and a locking spring for engaging the cover-locking piece with the front cover and urging the cover-locking piece in a direction in which the front cover is prevented from opening. When the front cover, cover-locking piece; and means for urging the respective members are applied to a compact tape cassette, problems arise in that the front cover springs require additional space and that it is necessary to extend the widthwise dimensions of the tape cassette since the cover-locking piece pivots in the widthwise direction of the tape cassette when releasing the lock. Moreover, there are many instances where the front cover springs undesirably come off during assembly of the tape cassette, which prevents the tape cassette from being easily and automatically assembled by machine. These problems are particularly prominent in the case where a plurality of springs are provided as the front-cover urging spring, the locking spring and the like, respectively.

On the other hand, it is necessary to provide an optical path aperture in a side surface portion of a tape cassette which employs a system for detecting the leading and trailing ends of a tape having a transparent tape attached to each of the leading and trailing ends thereof, as is employed in, for example, a VHS system VTR in which either one of light-emitting and light-receiving detecting means is entered into the cassette through the bottom surface thereof while the other is disposed outside of the tape cassette in opposition to the former through the tape within the tape cassette.

The optical path aperture is generally disposed at a side plate portion of the tape cassette case and can be covered, when the tape cassette is not in use, by the side plate portion of the front cover pivotally supported at the case side plate portions. However, the side plate portion will cover the optical path aperture at a predetermined distance therebetween in the case of a compact tape cassette which needs to provide the front-cover spring for urging the front cover and the cover lock for preventing the front cover from opening in the space defined between the side plate portion of the front cover and the case side plate portion which are a predetermined distance away from each other. It is contradictory, since the compact tape cassette is desirable to make the widthwise dimension thereof as small as possible.

The optical path aperture, similarly to the other openings of the tape cassette, causes dropouts since dust entering through the openings, adheres to the tape within the tape cassette. This problem is more serious, particularly, in the case of a portable tape cassette for short-wavelength and high-density recording since, in such a case, the tape cassette will be possibly carried in the pockets of clothing or the like.

SUMMARY OF THE INVENTION

Accordingly, it is a first object of the invention to prevent the intrusion of foreigh matter such as dust into a compact tape cassette, by covering the optical path aperture thereof when the tape cassette is not in use.

It is a second object of the invention to provide a construction capable of making a tape cassette more compact, by reducing the number of urging springs therein while obtaining a satisfactory function of the front cover and as well the cover-locking piece.

It is a third object of the invention to prevent the intrusion of foreign matter such as dust into a compact tape cassette by covering the optical path aperture thereof when the tape cassette is not in use and at the same time, to improve the assembling efficiency while preventing the front-cover spring from coming off during assembly of the tape cassette, and to enable the functions of the front cover, front-cover spring, cover-locking member and the like to be obtained by a simple construction.

It is a fourth object of the invention to provide a tape cassette which it is possible to automatically assemble by machine, prevents the locking spring particularly from being disengaged during assembly of the tape cassette while the locking spring can be extremely simply retained so as to allow the tape cassette to be automatically assembled, and is capable of being made more compact while obtaining a satisfactory functioning of the front cover and the cover-locking piece.

To these ends, according to the invention, there is provided a tape cassette comprising: a cassette case constituted by upper and lower halves; a front cover pivotally supported to case side plate portions in the front part of the cassette case and adapted to selectively take either a first pivoting position at which the front cover covers a tape stretched along an opening formed in the front surface of the cassette case or a second pivoting position at which the tape is uncovered; a first urging means for urging the front cover toward the first pivoting position; an optical path aperture opened in one of the case side plate portions facing a side plate portion of the front cover with a predetermined space interposed therebetween; a cover-locking piece pivotally supported by the cassette case in the space between the case side plate portion and one of the side plate portions of the front cover and adapted to pivot in a plane thicknesswise of the cassette case thereby to engage with an engaging projection formed on the front cover for preventing the pivoting of the front cover at the first pivoting position; and a second urging means for urging the cover-locking piece in the direction of engagement with the engaging projection formed on the front cover, wherein a shield member for covering the optical path aperture is formed on at least either the front cover or the cover-locking piece at the position where the engaging projecton and the cover-locking piece engage each other.

The above and other objects, features and advantages of the invention will be apparent from the following description when taken in connection with the accompanying drawings.

DESCRIPTION OF THE PREFERRED EMBODIMENTS

Preferred embodiments of the invention will be described hereinunder with reference to the accompanying drawings.

Figure 1:
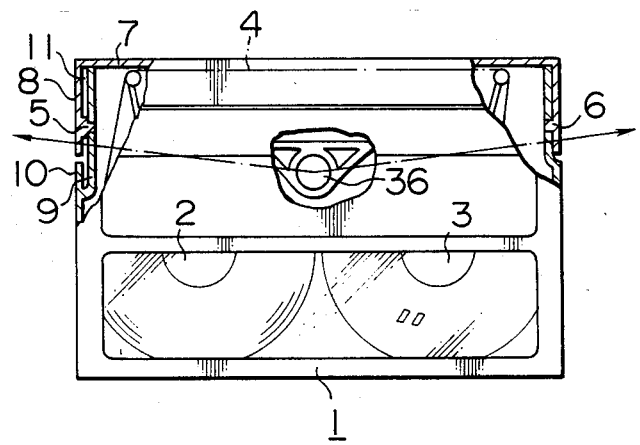
FIG. 1 is a partly cutaway schematic plan view of a tape cassette in accordance with a first preferred embodiment of the invention.
Figure 2:
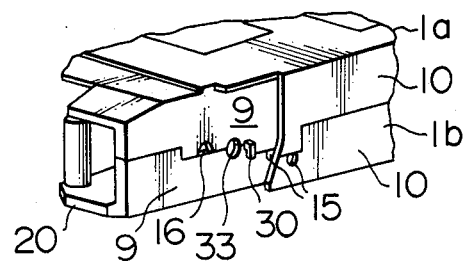
FIG. 2 is a perspective view of an essential part of the tape cassette shown in FIG. 1.
Figure 3:
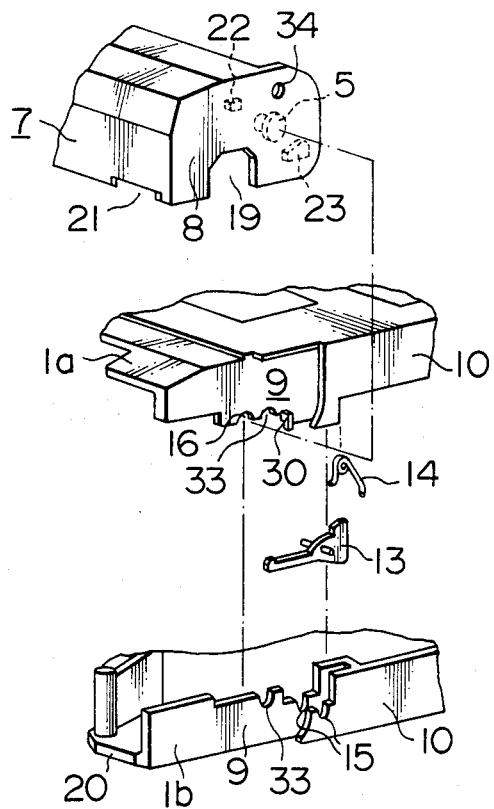
FIG. 3 is an exploded perspective view of the essential part shown in FIG. 2.

First of all, FIG. 1 is a partly cutway schematic plan view of a tape cassette in accordance with a first preferred embodiment of the invention. A tape 4 wound on a pair of reels 2, 3 and stretched along an opening formed in the front surface of a cassette case 1 is covered, when the tape cassette is not in use, by a front cover 7 pivotally supported by side surfaces of the cassette case 1 through pivot portions 5, 6. A space 11 is defined at one side of the cassette case by a side plate portion 8 of the front cover 7, a case side plate portion 9 of the cassette case 1 and a case outer plate portion 10 which are predetermined distances away from each other. Disposed within the space 11 are a front-cover spring 12 for pivotally urging the front cover 7 and a coverlocking piece 13, together with a locking spring 14 as well as first and second projections 23, 22 as described hereinafter (see FIGS. 3 and 4). Moreover, an opening 36 for allowing a light-emitting element or light-receiving detecting means (which are not shown) to enter the inside of the cassette case 1 is provided in a substantially central portion of the cassette case 1. In addition, an optical path aperture 33 is opened in the case side plate portion 9, as shown in FIG. 2 which is a perspective view, so as to form an optical path shown by a one-dot-and-dash line through the tape inside of the cassette case 1. Thus, the passing of a transparent tape (not shown) attached to each of the leading and trailing end of the tape 4 is detected by the light-emitting element and the light-receiving detecting means (now shown) which are adapted to be positioned in the opening 36 and the outside the cassette case 1, or vice versa, respectively, for controlling the traveling mode of the tape 4. It is to be noted that, in order to prevent the intrusion of foreign matter such as dust into the cassette case 1 through the opening 36, a transparent collar (not shown) made of acrylic resin or the like is fitted in the opening 36 in correspondence with the height of the optical path within the cassette case 1. Referring now to FIG. 3 showing an essential part of the tape cassette by way of an exploded perspective view, the cassette case 1 (FIG. 1) is constituted by an upper half 1a and a lower half 1b. The lower half 1b has recesses 15 formed in the case side plate portion 9 and the case outer plate portion 10, respectively, for supporting the cover-locking piece 13 pivotally in a plane thicknesswise of the tape cassette. The upper half 1, on the other hand, has a recess 16 formed in the side plate portion 9 for pivotally supporting the front cover 7. As shown in FIG. 2, the recesses and projections are arranged so as to face each other in order to pivotally clamp the above-mentioned respective members.

Figure 4:
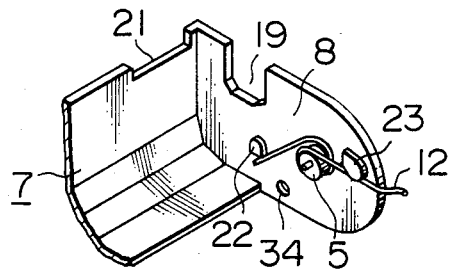
FIG. 4 is a perspective view of the essential part shown in FIG. 2.
Figure 5:
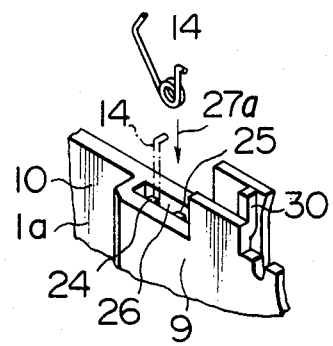
FIG. 5 is a perspective view of a part related to the essential part shown in FIG. 2.
Figure 6:
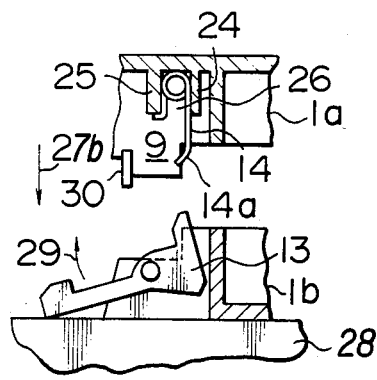
FIG. 6 is a schematic side elevational view showing the assembling process of the essential part shown in FIG. 2.
Figure 7:
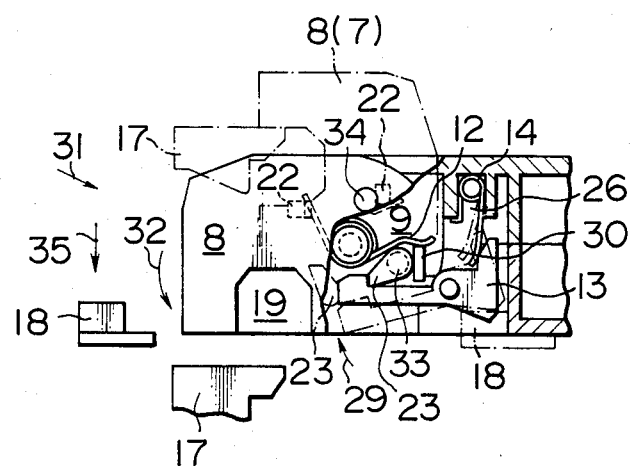
FIG. 7 is a schematic side elevational view showing the action of the essential part shown in FIG. 2.

The front cover 7 is provided with a notch 19 for allowing the entry of a cover-opening member 17 (FIG. 7), described later, and a notch 21 for partly allowing the entry of a lock-releasing member 18 (FIG. 7) for the cover-locking piece 13 which enters the space 11 shown in FIG. 1 from the outside of the front surface of the cassette case 1 and which notch 21 faces an insertion direction setting abutment 20 for a cassette holder (not shown) into which the tape cassette is once inserted in order to be properly loaded into the recording/reproducing device (not shown). Moreover, as shown in FIG. 4, the first projection 23 and the second projecton 22 are formed on the inner surface of the side plate portion 8 of the front cover 7, i.e., at the positions where the projections 23, 22 project into the space 11 shown in FIG. 1 and face the case side plate portion 9. Under the state where the front cover 7 has not yet been mounted on the cassette case 1, the central portion of a front-cover spring 12 such as, for example, a torsion coil spring is fitted on the pivot portions 5 of the front cover 7, and both ends of the spring 12 are retained by the first and second projections 23, 22 each having a shape suitable for hooking the projections 23, 23. On the other hand, a recess 26 defined by guide walls 24, 25 is provided between the case side plate portion 9 and the case outer plate portion 10 of the upper half 1a as shown in FIG. 5. A locking spring 14 is retained, being fitted into the recess 26 in the direction of an arrow 27a against the resilient force thereof. Then, the assembly of the upper and lower halves 1a, 1b and the front cover 7 (FIG. 3) is carried out as follows. First, as shown in FIG. 6, the lower half 1b having the cover-locking piece 13 temporarily and pivotally supported by the recesses 15 (FIG. 3) is placed on a table 28. Then, with the locking spring 14 fitted in the recess 26, the upper half 1a is lowered in the direction of an arrow 27f until the upper and lower halves 1a, 1b come into contact with each other and are united together. In this case, the locking spring 14 having a bent portion 14a formed at one end thereof is smoothly lowered while being bent more than that in the state where it is fitted in the recess 26, causing the cover-locking piece 13 to be urged, thereby the cover locking pivots piece 13 in the thicknesswise direction (the direction of an arrow 29) of the cassette case 1 until abutting against a projection 30 formed on the case side plate portion 9 of the upper half 1a. Thereafter, as shown in FIG. 7, the side plate portion 8 of the front cover 7 accompanied by the front-cover spring 12 is outstretched, being bent widthwise of the tape cassette. Under this state, the front cover 7 is moved in the direction of an arrow 31, and the pivot portion 5 is inserted into the recess 16 (FIG. 3) so that the front cover 7 is clamped by the upper and lower halves 1a, 1b. Alternatively, under the state where the front-cover spring 12 shown in FIG. 4 is retained on the front cover 7 and the pivot portion 5 is inserted in the recess 16 of the upper half 1a, the front cover 7 is lowered in the direction of the arrow 27f shown in FIG. 6. At this time, although one end of the front-cover spring 12 is allowed to maintain the engagement with the second projection 22 as a part of the front cover 7, the other end is disengaged from the first projection 23 and then engaged with the projection 30 formed on the case side plate portion 9 of the upper half 1a, causing the front cover 7 to be urged so as to pivot in the direction of an arrow 32.

In this case, the height of the first projection 23 is set to be slightly smaller than the distance between the side plate portion 8 of the front cover 7 and the case side plate portion 9. Moreover, as will be apparent from FIG. 7, the first projection 23 which is the retainer for the front-cover spring 12, functions also as an engaging part with the cover-locking piece 13. The first projection 23 also serves to cover the optical path aperture 33 (FIG. 2) formed in the case side plate portion 9 (FIG. 2) which detects the leading and trailing ends of the tape 4 each attached with the transparent tape through which light is transmitted between the inside and outside of the tape cassette (FIG. 1), thereby preventing the intrusion of dust into the tape cassette through the optical path aperture 33 when the tape cassette is not in use. In addition, the side plate portion 8 of the front cover 7 has an aperture 34 for allowing the passing of light at a position where the front cover is open.

Next, the action for releasing the cover-locking piece 13 and the action for opening the front cover 7 will be described with reference to FIG. 7. The insertion of the tape cassette into the cassette holder (not shown) which receives the tape cassette in order to properly load the cassette in the recording/reproducing device (not shown) causes the lock-releasing member 18 which is formed on the cassette holder and which is made out of sheet metal material to enter the space 11 (FIG. 1) through the notch 21 formed in the front surface of the front cover 7, as already described, to advance to the position shown by a one-dot-and-dash line. Consequently, the lock-releasing member 18 abuts against the cover-locking piece 13 so that the latter is pivoted in the direction opposite to the direction of the arrow 29 against the locking spring 14. In other words, the lock-releasing member 18 disengages the cover-locking piece 13 from the first projection 23 of the front cover 7 and pivots the cover-locking piece 13 in the direction for allowing the front cover 7 to open (the position thereof reached after the pivoting is shown by the one-dot-and-dash line).

Then, the tape cassette, together with the cassette holder (not shown), is pushed down toward the recording/reproducing device, i.e., in the direction of an arrow 35. Thereby, a front-cover opening member 17, which is fixed to the recording reproducing device or movably attached to the cassette holder and adapted to relatively advance into the tape cassette to the degree including the space 11 and the thickness of the side plate portion 8 of the front cover 7 as shown in FIG. 1, advances into the tape cassette through its bottom surface while taking a form corresponding to the notch 19, to open the front cover 7 to the position shown by the one-dot-and-dash line at the end of the loading.

It is obvious that, although not shown, the cassette holder has therein means for urging the tape cassette in the direction of the arrow 35 with a force excelling the forces of the front-cover spring 12, locking spring 14 and the like, so that the urging means is adapted not to disturb their actions. It is to be noted also that the torsion coil spring exemplified in the embodiment as the locking spring fitted in the recess 26 (FIGS. 5, 6 and 7) of the upper half 1a is not exclusive and, for example, a leaf spring or the like may be employed.

Moreover, after the front cover 7 has been mounted, the other end of the front-cover spring 12 may be engaged with the cover-locking piece 13 in place of the projection 30 so as to engage the cassette case indirectly. In this case, the locking spring 14 can be removed.

Figure 8:
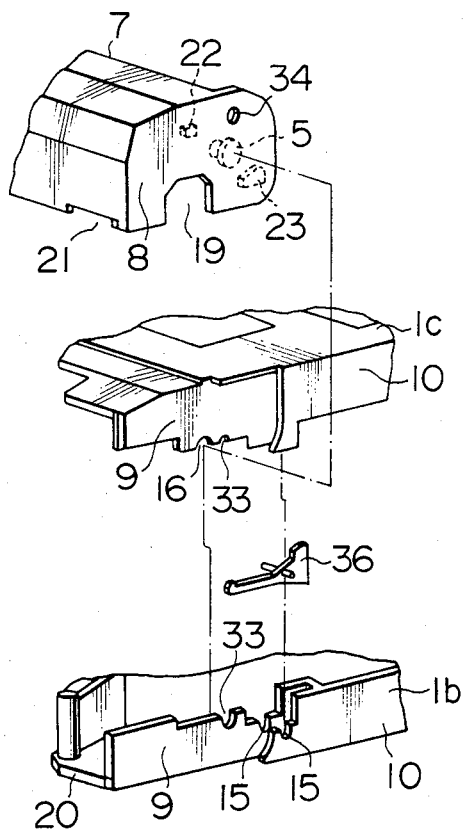
FIG. 8 is an exploded perspective view of an essential part of a tape cassette in accordance with a second preferred embodiment of the invention.
Figure 9:
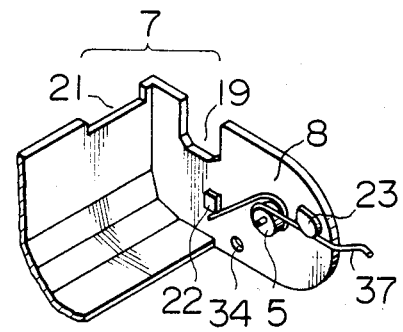
FIG. 9 is a perspective view of the essential part shown in FIG. 8 before the tape cassette is assembled.

A second preferred embodiment of the invention capable of removing the locking spring 14 and making the front-cover spring 12 also serve as the locking spring 14 will be described hereinunder with reference to FIGS. 8 through 10. The basic structure of the tape cassette in accordance with the second embodiment is the same as the first embodiment so far as is schematically shown in FIG. 1. The other structural differences from the first embodiment are that the locking spring 14 shown in FIGS. 2 through 7 is not used, that the projection 30 and the guide walls 24, 25 provided to the upper half 1a are eliminated, that the shape of the cover-locking piece 13 is slightly modified, and that a torsion coil spring one of engaging ends of which is long in length is newly employed in place of the front-cover spring 12. In order to facilitate understanding, portions or members in the second embodiment having structures employed according to basically the same ideas or performing the same functions as those in the first embodiment are denoted by the same reference numerals as those in the first embodiment, and the upper half, the cover-locking piece and the torsion coil spring are designated by reference numerals 1c, 36 and 37, respectively. Referring now to FIG. 8 which is an exploded perspective view of an essential part of the tape cassette in accordance with the second preferred embodiment of the invention, the cassette case 1 (FIG. 1) is constituted by the upper half 1c and the lower half 1b. The recesses 15 are formed in the side plate portions 9, 10 of the lower half 1b for supporting the cover-locking piece 36 pivotably in the thicknesswise direction of the tape cassette, while the recess 16 is formed in the side plate portion 9 of the upper half 1c for pivotally supporting the front cover 7 through the pivot portion 5. The recesses and projections are arranged so as to face each other in such positions as to pivotally clamp the above-mentioned respective members. It is to be noted that the front cover 7 is provided with the notch 19 for allowing the entry of the already-described cover-opening member 17 (FIGS. 7 and 10) and the notch 21 which allows at a certain position the entry of the lock-releasing member 18 (FIGS. 7 and 10) for releasing the coverlocking piece 36 to enter the space 11 shown in FIG. 1 from the outside of the tape cassette and which faces the insertion direction setting abutment 20 against the cassette holder (not shown) that is once inserted with the tape cassette in order to be properly loaded into the recording and reproducing device (not shown). Moreover, as shown in FIG. 9, the first projection 23 and the second projection 22 are formed on the inner surface of the side plate portion 8 of the front cover 7, i.e., at positions where the projections 23, 22 project into the space 11 shown in FIG. 1. Under the state where the front cover 7 has not been mounted, the torsion coil spring 37 is fitted on the pivot portion 5 having both its ends retained by the first and second projections 22, 23 in shapes suitable for retention thereof, respectively.

Figure 10:
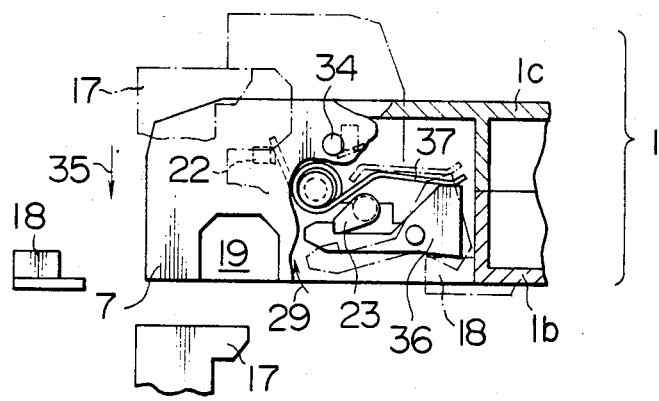
FIG. 10 is a side elevational view showing the action of the essential part shown in FIG. 8.

In assembling, as shown in FIGS. 10 and 8, the cover-locking piece 36 is first installed on the lower half 1b. After the upper and lower halves 1c, 1b are united together, the side plate portion 8 of the front cover 7 accompanied by the torsion coil spring 37 is outstretched and bent in the widthwise direction of the tape cassete and moved in the direction of the arrow 35 until the pivot portion 5 is inserted into the recess 16 so as to be clamped by the upper and lower halves 1c, 1b. Alternatively, in the state shown in FIG. 9 where the torsion coil spring 37 is retained on the front cover 7 and the pivot portion 5 is inserted in the recess 16 (FIG. 8) of the upper half 1c, the upper half 1c is moved in the direction of the arrow 35 shown in FIG. 10 to assemble the tape cassette. In ths case, although one end of the torsion coil sping 37 is allowed to maintain the engagement with the second projection 22 as a part of the front cover 7, the other end is disengaged from the first projection 23 and engaged with the cover-locking piece 36, urging the same in the direction (the direction of the arrow 29) for preventing the front cover 7 from opening.

It is to be noted that, as will be apparent from FIG. 10, the first projection 23 which serves as the retainer for receiving the torsion coil spring (37) functions as the engaging part with the cover-locking piece 36. Moreover, the first projection 23 covers the optical path aperture 33 (FIG. 8) formed in the side plate portion 9 for detecting the leading and trailing end of the tape 1 (FIG. 1) when a transparent leader tape attached thereto crosses light passing between the inside and outside of the tape cassette through the tape 4, thereby preventing dust from entering the inside of the tape cassette through the optical path aperture when tha tape cassette is not in use. In addition, the side plate portion 8 of the front cover 7 is provided with the hole 34 for allowing the passing of light at a position where the front cover 7 is open.

It is to be noted that explanation of the action for releasing the cover-locking piece 36 and the action for opening the front cover 7 are omitted since they are the same as those in the first embodiment.

As described above, according to the second embodiment, both the front cover and the cover-locking piece can be urged by the use of only a single urging spring. Moreover, it is possible to improve the assembling efficiency while preventing the urging spring from coming off during assembly. Furthermore, it is possible to largely reduce the necessary widthwise dimension of the tape cassette while obtaining satisfactory functions of the front cover and cover-locking piece, thereby making it possible to provide a compact tape cassette.

Next, a method of covering the optical path aperture will be mainly described hereinunder with reference to FIGS. 11 through 15 in combination showing a third preferred embodiment of the invention. The basic structure of a tape cassette in accordance with the third embodiment of the invention is also the same as that of the first embodiment so far as is schematically shown in FIG. 1. Therefore, the description thereof is omitted.

Figure 11:
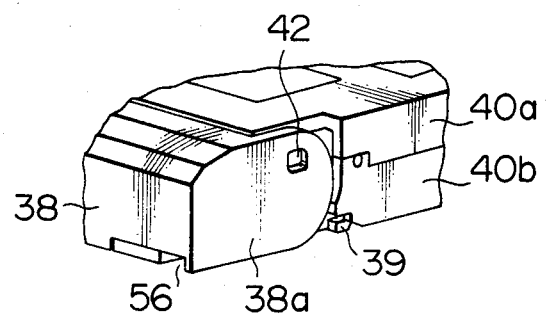
FIGS. 11 and 12 are perspective views of an essential part of a tape cassette in accordance with a third preferred embodiment of the invention.
Figure 12:
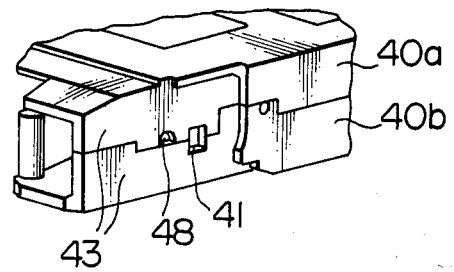
Figure 13:
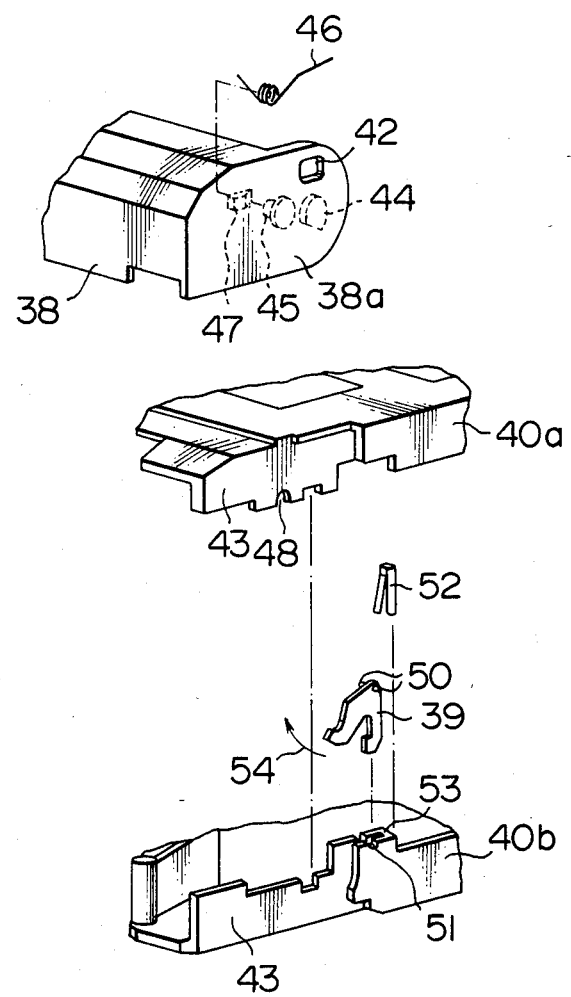
FIG. 13 is an exploded perspective view of the essential part shown in FIGS. 11 and 12.
Figure 14:
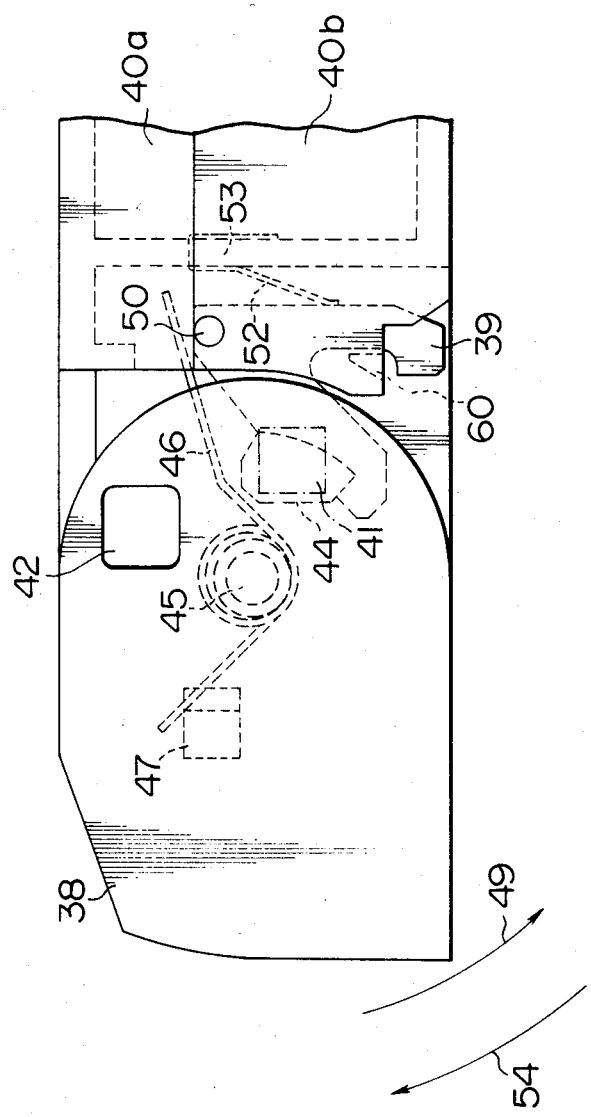
FIGS. 14 and 15 are side elevational views showing the action of the essential part shown in FIGS. 11 and 12.
Figure 15:
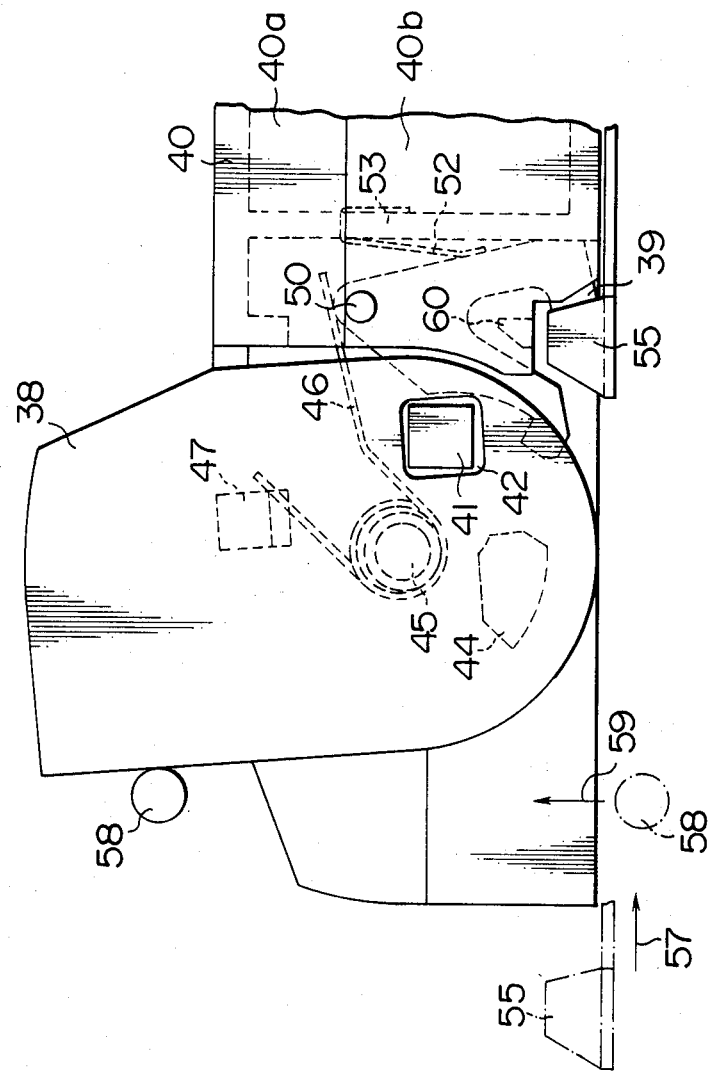

FIG. 11 is a perspective view of an essential part of the tape cassette in accordance with the third embodiment of the invention, while FIG. 12 is a perspective view of the essential part in the state where its front cover 38, cover-locking piece 39 and the like shown in FIG. 11 are removed and the upper half 40a and the lower half 40b are combined together. As shown in FIG. 12, the upper and lower halves 40a and 40b are formed with an optical path aperture 41 in the same manner as those in the already described first and second embodiments. In addition, an aperture 42 is formed in a side plate portion 38a of the front cover 38. The aperture 42 is, as shown in FIG. 15, located at a position corresponding to the optical path aperture 41 when the front cover 38 takes its open position as shown in FIG. 15, thereby it is possible to establish the optical path schematically shown by the one-dot-and-dash line in FIG. 1. It is to be noted that apertures similar to the optical path aperture 41 and the aperture 42 are provided on the opposite side in correspondence with the optical path, although not shown. In addition, as shown in FIG. 13 illustrating the essential part by way of an exploded perspective view, a first projection 44 having a height corresponding to the space 11 shown in FIG. 1 and a second projection 47 for retaining one end of a front-cover spring 46 with the other end retained by the cover-locking piece 39 as shown in Figs. 14 and 15 are provided on the surface of the front cover 38 facing case side plate portions 43 in the front parts of the respective upper and lower halves 40a, 40b.

The front cover 38 is pivotally supported through its pivot portion 45 received by a pivot hole 48 defined by the upper and lower halves 40a, 40b, and is constantly urged in the direction of an arrow 49 by the urging force in the direction of the arrow 49 of the front-cover spring 46. The cover-locking piece 39 having a thickness corresponding to the space 11 shown in FIG. 1 is supported at its pivot portion 50 so as to be pivotable within a plane thicknesswise of the tape cassette by the pivot hole 51 defined by the upper and lower halves 40a, 40b. Moreover, the cover-locking spring 52 is inserted into a wall portion 53 of the lower half 40b to urge the cover-locking piece 39 in the direction of an arrow 54.

Next, the action for releasing the cover-locking piece 39 and the action for opening the front cover 38 will be described hereinunder with reference to FIGS. 14 and 15. FIG. 14 shows the state where the front cover 38 is closed and prevented from pivoting, by the cover-locking piece 39. Under this state, the optical path aperture 41 formed in the case side plate portion 43 of the tape cassette, shown also in FIG. 12, is covered by a part of the cover-locking piece 39 and the first projection 44 engaged with the cover-locking piece 39 to prevent the pivoting of the front cover 39, thereby practically preventing foreign matter such as dust from entering the inside of the tape cassette through the optical path aperture. The cover-locking piece 39 is released in such a manner that, as shown in FIG. 15, a protrusion 55, for example, provided on the cassette holder (not shown)

into which the tape cassette is inserted in order to be moved to the final loading position in the recording reproducing device (not shown) relatively advances into the space 11 in the front part of the tape cassette shown in FIG. 1, in the direction of an arrow 57 through a notch 56 (see FIG. 11) of the front cover 38 forming an entering passage in correspondence with the space 11, the abuts against the cover-locking piece 39, causing the latter to pivot overcoming the urging force in the direction of the arrow 54 of the cover-locking spring 52. Further moving the tape cassette, together with the cassette holder, into the recording/reproducing device causes the cover-opening member 58 to relatively rise through the bottom surface of the tape cassette in the direction of an arrow 59 and to abut against the front cover 38 to thereby pivot the latter. Then, when the front cover 38 is at the position shown in FIG. 15 after completing its pivoting motion, the aperture 42 formed in the side plate portion 38a of the front cover 38 comes to the position corresponding to the optical path aperture 41 defined by the upper and lower halves 40a, 40b to form the optical path shown by the one-dot-and-dash line in FIG. 1.

In addition, a stopper 60 is integrally molded with the lower half 40b, having a thickness corresponding to the space 11 shown in FIG. 1. When the cover-locking piece 39 is pivoted in the direction of the arrow 49 by a first means such as, for example, fingers excluding the protrusion 55 as a cover-locking releasing means, from the state where the cover-locking piece 39 is engaged with the projection 44 as shown in FIG. 14, and at the same time, the front cover 38 is pivoted in the direction of the arrow 54 by a second means, for example, fingers excluding the cover-opening member 58 as a front-cover opening means, with no more urging force in the direction of the arrow 49 applied by the first means, the stopper 60 abuts against the cover-locking piece 39 to restrain the pivoting in the direction of the arrow 54 of the cover-locking piece 39 forced by the cover-locking spring 52.

As described above, according to this embodiment, the optical path aperture 41 for detecting the leading and trailing ends of the tape, formed in the case side plate portion 43 is covered by the first projection 44 formed on the side plate portion 38a of the front cover 38 which pivots to cover the tape stretched over the front surface of the tape cassette, and the cover-locking piece 39 which engages the first projection 44 in order to hold the front cover 38 in its closed position, thereby it is possible to prevent foreign matter from entering the inside of the tape cassette through the optical path aperture 41 when the tape cassette is not in use.

Figure 16:
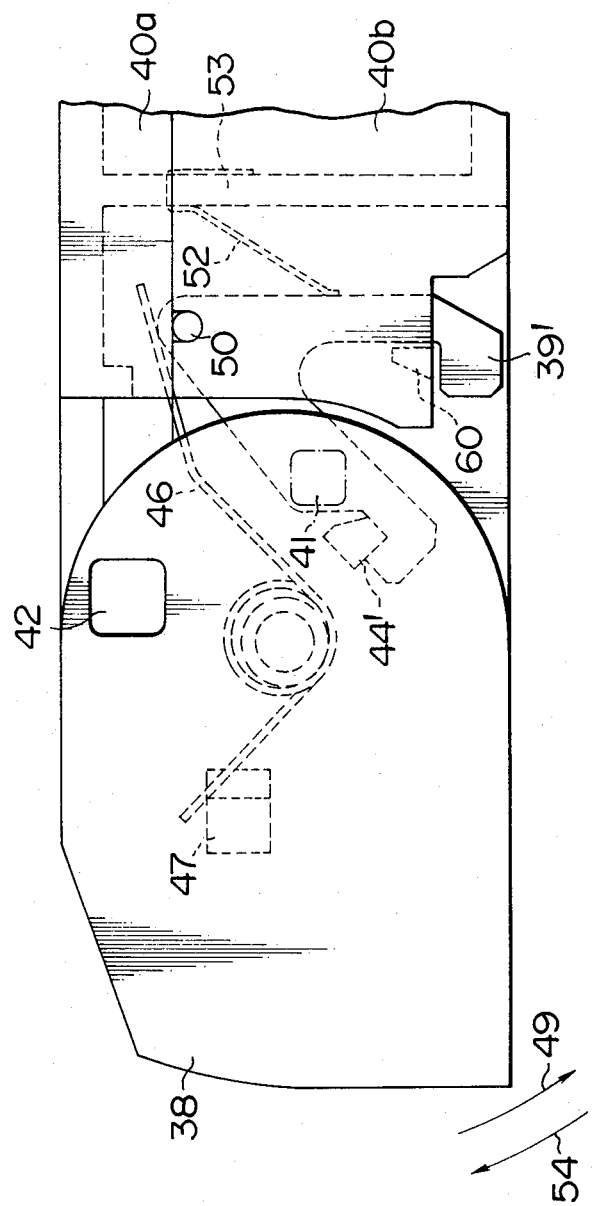
FIGS. 16 and 17 are side elevational views of an essential part of a tape cassette in accordance with a fourth preferred embodiment of the invention, showing the structure and action thereof.
Figure 17:
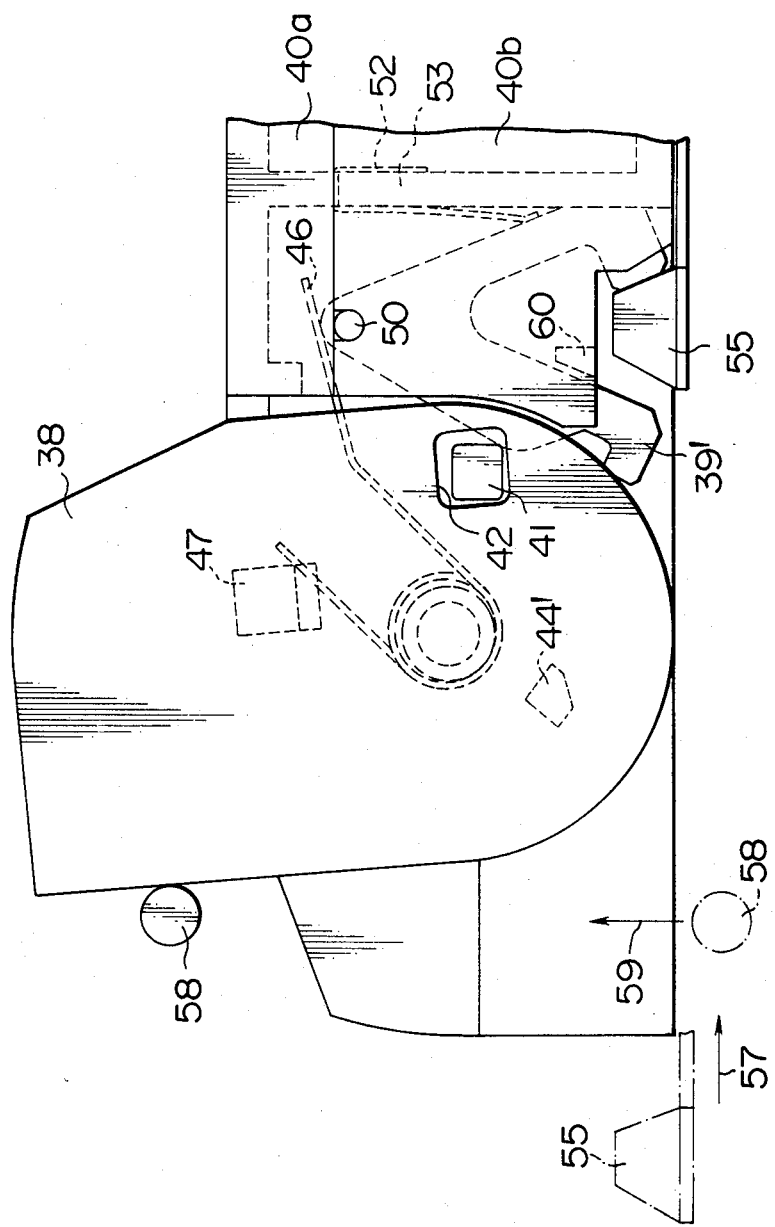

Next, a fourth preferred embodiment of the invention will be described hereinunder with reference to FIGS. 16 and 17. It is to be noted that the same constituent elements as those in the third embodiment are designated by the same reference numerals and the description thereof is omitted.

In the third embodiment, the optical path aperture 41 is covered by both the cover-locking piece 39 and the first projection 44. In the fourth embodiment, however, the optical path aperture 41 is covered by only a cover-locking piece 39' which engages a first projection 44' of the front cover 38 in order to hold the front cover 38 in its closed position when it is not in use. This is effected by changing the position of the pivot portion 50 of the cover-locking piece 39 as its pivot point as well as by modifying the shape and by replacing the position of the projection 44. Then, when the front cover 38 is released from its restraint of the cover-locking piece 39', the front cover 38 is pivoted by the cover-opening member 58 into the position shown in FIG. 17. As a result, the aperture 42 formed in the side plate portion 38a of the front cover 38 comes to the position corresponding to the optical path aperture 41, thereby allowing an optical path to be established.

In other words, in the arrangement according to the third embodiment wherein the optical path aperture 41 is covered by both the over-locking piece 39 and the projection 44, any gap at the junction between the cover-locking piece 39 and the projection 44 may allow the intrusion of foreign matter therethough. According to this embodiment, however, the intrusion of foreign matter is completely prevented by covering the optical path aperture 41 with only the cover-locking piece 39'.

As will be fully understood from the foregoing description, the tape cassette in accordance with the invention has the front cover which pivots to cover the tape stretched along the front surface of the cassette case and which is provided with the side plate portion facing the corresponding one of the case side plate portions of the cassette case with a predetermined space interposed therebetween, together with the cover-locking piece which pivots in the thicknesswise direction of the cassette case within the space defined by the case side plate portion and the side plate portion of the front cover and engages the front cover. Thereby, it becomes possible to prevent foreign matter from entering the inside of the tape cassette through the optical path aperture formed in the case side plate portion by covering at least a part of the optical path aperture with the cover-locking piece at the position where the front cover covers the stretched tape.

Although the invention has been described through specific terms, it is to be noted here that the described embodiments are not exclusive and various changes and modifications may be imparted thereto without departing from the scope of the invention which is limited solely by the appended claims.

What is claimed is:
1. A tape cassette comprising;
a cassette case having upper and lower halves and side portions;
a front cover having side plate portions and pivot portions formed on said side plate portions through which said cover is pivotally supported to said case side portions so that said front cover is movable between a first pivoting position where said front cover covers a tape stretched along an opening formed in the front surface of said cassette case and a second pivoting position where the tape is uncovered, said front cover being formed with first and second engaging projections on one of said side plate portions;
a cover-locking piece adapted to be engaged with an engaging projection formed on said one side plate portion so that said cover-locking piece prevents said front cover from moving from said first pivoting position upon engagement of said cover-locking piece with its engaging projection;
a first urging means fitted onto one of said pivot portions which are formed on said one side plate portion for urging said front cover toward said first pivoting position,
said first urging means having opposite ends, both of said ends being retained by said first and second engaging projections respectively upon complete detachment of said front cover from said cassette case, while upon installation of said front cover onto said cassette case, one end of said first urging means maintains its engagement with said second engaging projection, but the other end thereof is disengaged from said first engaging projection and then is engaged with said cassette case directly or indirectly through said cover-locking piece which therefore urges said front cover toward said first pivoting position; and a second urging means for urging said cover-locking piece into engagement with its engaging projections.

2. A tape cassette according to claim 1, wherein said first urging means and said second urging means are formed by a single torsion coil spring having its coiled portion fitted onto said one of said pivot portions, both ends of said torsion coil spring being retained by said first and second engaging projections upon complete detachment of said front cover from said cassette case, while upon installation of said front cover onto said cassette case one end of said torsion coil spring maintains its engagement with said second engaging projection, but the other end thereof is disengaged from said first engaging projection and then is engaged with said cover-locking piece.

3. A tape cassette according to claim 1, wherein at least one of said case side portions of said cassette case is formed, on the front end side thereof, with a double wall section having inner and outer walls, said double wall section defining therein a groove portion in which said cover-locking piece is supported rotatably within a plane parallel to said one of said case side portions, said inner wall being extended forward from the front end of said outer wall, and wherein an optical path opening part is formed in said inner wall section in a part extending from the front end of said outer wall and opposing said one side plate portion of said front cover with a predetermined space therebetween, said optical path opening being shielded by at least one of said cover-locking piece and said first engaging projection which has a height slightly less than said predetermined space when said front cover takes said first pivoting position and is engaged with said cover-locking piece.

4. A tape cassette according to claim 1, wherein said first engaging projection is said engaging projection which engages with said cover-locking piece so as to hold said front cover at said first pivoting position.

* * * * *